(12) United States Patent
Lu (10) Patent No.: US 6,591,286 B1
(45) Date of Patent: Jul. 8, 2003

(54) PIPELINED CARRY-LOOKAHEAD GENERATION FOR A FAST INCREMENTER

(75) Inventor: Wei-Ping Lu, Saratoga, CA (US)

(73) Assignee: NeoMagic Corp., Santa Clara, CA (US)

( * ) Notice: Subject to any disclaimer, the term of this patent is extended or adjusted under 35 U.S.C. 154(b) by 0 days.

(21) Appl. No.: 09/683,563

(22) Filed: Jan. 18, 2002

(51) Int. Cl.[7] .............................................. G06F 7/50
(52) U.S. Cl. ...................................................... 708/672
(58) Field of Search ......................................... 708/672

(56) References Cited

U.S. PATENT DOCUMENTS

| 4,084,254 A | 4/1978 | Birney et al. ................ 364/766 |
| 4,110,832 A | 8/1978 | Leininger et al. ............ 364/786 |
| 4,153,939 A | 5/1979 | Kudou ......................... 364/770 |
| 4,486,851 A | 12/1984 | Christopher et al. ......... 364/770 |
| 4,623,982 A | 11/1986 | Ware ........................... 364/770 |
| 4,685,078 A | 8/1987 | Torres ......................... 364/770 |
| 4,858,168 A | 8/1989 | Hwang ......................... 364/787 |
| 4,956,802 A | 9/1990 | Priem .......................... 364/787 |
| 5,027,310 A | 6/1991 | Dalrymple ................... 364/770 |
| 5,062,057 A | 10/1991 | Blacken et al. .............. 354/518 |
| 5,095,458 A | 3/1992 | Lynch et al. ................. 364/787 |
| 5,119,494 A | 6/1992 | Garman ....................... 395/700 |
| 5,208,770 A | 5/1993 | Ito .............................. 364/768 |
| 5,280,579 A | 1/1994 | Nye ............................ 395/166 |
| 5,375,079 A | 12/1994 | Uramoto et al. ............. 364/736 |
| 5,384,724 A | 1/1995 | Jagini .......................... 364/770 |
| 5,517,440 A | 5/1996 | Widigen et al. .............. 364/786 |
| 5,548,546 A | 8/1996 | Jang et al. .................... 364/786 |
| 5,555,517 A | 9/1996 | Agrawal et al. .............. 364/770 |
| 5,619,441 A | 4/1997 | Bartling ....................... 364/770 |
| 5,945,974 A | 8/1999 | Sharma et al. ............... 345/115 |
| 6,101,620 A | 8/2000 | Ranganathan ................ 714/718 |
| 6,199,090 B1 | 3/2001 | Mansingh et al. ........... 708/672 |
| 6,279,024 B1 * | 8/2001 | Chappell et al. ............. 708/672 |
| 6,347,327 B1 * | 2/2002 | Petro et al. .................. 708/672 |
| 6,516,335 B1 * | 2/2003 | Martin et al. ................ 708/672 |

* cited by examiner

Primary Examiner—David H. Malzahn
(74) Attorney, Agent, or Firm—Stuart T. Auvinen (57) ABSTRACT

An incrementer pipelines the generation of carry lookahead signals. Count registers hold a current count of the incrementer. The current count is fed back as inputs to sum logic, which generates sum bits that are latched into the count registers as a next count. All-ones detect logic detects when all lesser-significance bits in the current count are ones. When all lesser bits are ones, the sum logic toggles the count bit to generate the sum bit for that bit position. Pre-carry logic generates pre-carry lookahead signals from the sum bits. The pre-carry lookahead signals are latched into pipelined carry registers. The pipelined carry registers drive pipelined carry lookahead signals to the all-ones detect logic. Thus carry lookahead signals are generated from a prior sum but used in a next clock cycle to generate then next sum.

20 Claims, 6 Drawing Sheets

FIG. 1

PRIOR ART

| CURRENT STATE A | | NEXT STATE S |
|---|---|---|
| 0000 | | 0001 |
| 0001 | | 0010 |
| 0010 | | 0011 |
| 0011 | | 0100 |
| 0100 | | 0101 |
| 0101 | | 0110 |
| 0110 | LOW BITS = 111 | 0111 |
| 0111 | → XOR WITH HIGH BIT | 1000 |
| 1000 | | 1001 |
| 1001 | | 1010 |
| 1010 | | 1011 |
| 1011 | | 1100 |
| 1100 | | 1101 |
| 1101 | LOW BITS = 111 | 1110 |
| 1110 | | 1111 |
| 1111 | → XOR WITH HIGH BIT | 0000 |

PIPELINED CARRY-LOOKAHEAD GENERATION FOR A FAST INCREMENTER

BACKGROUND OF INVENTION

This invention relates to computer arithmetic devices, and more particularly to incrementers.

Many types of computing systems include an arithmetic-logic-unit (ALU). The ALU may be capable of performing sophisticated logical and arithmetic operations including multiply and divide. Special logic blocks may be added to speed up the more complex operations. A dedicated multiplier can rapidly perform multiply operations, while an integer divider can perform divide operations that otherwise would require thousands of clock cycles of the basic ALU.

These auxiliary math units may themselves contain several smaller blocks, such as shifters, adders, and leading-zero and other condition detectors. In particular, a divider may use an adder to increment a value such as for rounding a value from a floating point datapath. A general-purpose adder could be used for this sub-function.

Figure 1:
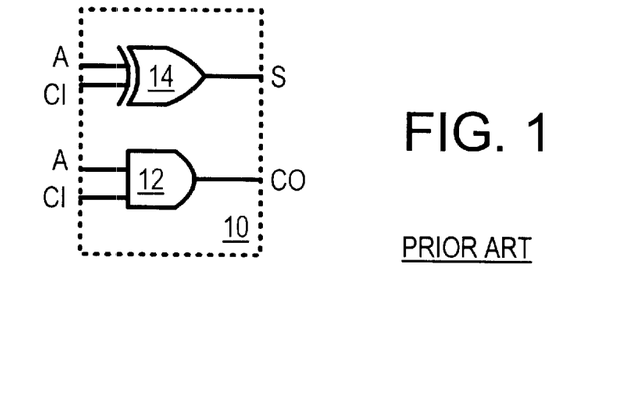
FIG. 1 shows a prior-art half-adder cell.

Adders are often constructed from a one-bit adder cell known as a half-adder. FIG. 1 shows a prior-art half-adder cell. The one-bit input A of bit position (i) is added to a carry-in input CI from the next lower bit position (i−1).

Both a sum S and a carry-out CO to the next higher bit position (i+1) are generated by half-adder cell 10. The sum at position (i) of A and CI can be generated by exclusive-OR (XOR) gate 14, while the carry out CO to position (i+1) is generated by AND gate 12.

This is known as a half-adder cell because to perform a full add of two inputs X, Y, two such half-adder cells are needed for each bit position. One half-adder cell adds bit (i) of inputs X and Y to generate A(i), while the second half-adder cell adds the intermediate result A(i) to the carry CI(i) to generate the final sum.

While a full adder can be used to increment a binary number, a dedicated incrementer can be constructed. This incrementer can only add 1 or 0 to an input; it cannot add an arbitrary number as can a full adder. However, the amount of logic inside the incrementer can be less than the logic inside a full adder. A single half-adder cell is needed for each bit position in the incrementer, while two half-adder cells are required for each bit position in the full adder.

Figure 2:
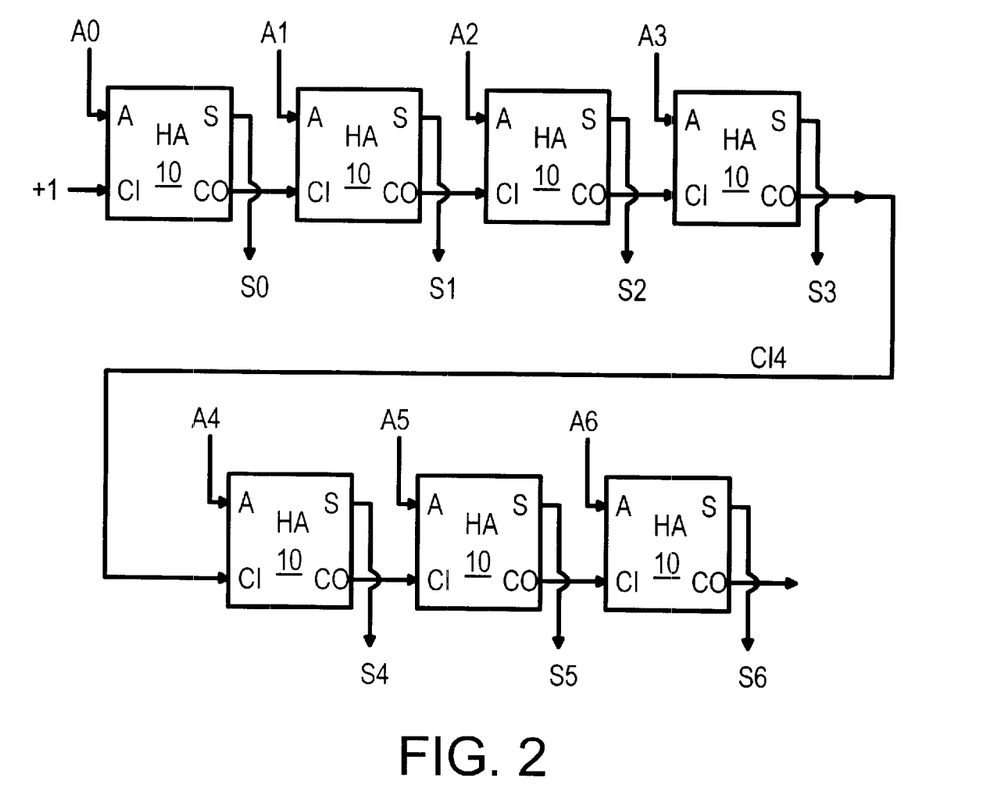
FIG. 2 shows a dedicated ripple-carry incrementer.

FIG. 2 shows a dedicated ripple-carry incrementer. Seven half-adder cells 10 are strung together to form a 7-bit incrementer. The carry-input CI to the lowest (least-significant bit or LSB) half-adder cell 10 is set to 1 to perform an increment. This LSB carry input may also be set to zero when no increment is desired.

The LSB half-adder cell 10 adds this lowest CI to the LSB of input A, A(0), to form sum bit S(0). The carry output of bit 0 is coupled to the carry input CI of the half-adder cell 10 adding the next higher bit, A(1). This second half-adder cell 10 generates sum S(1) and a carry out CI that is connected to the carry input CI of the third half-adder cell 10.

The carry output generated by each half-adder cell is applied to the carry input of the next higher half-adder cell. The final carry output CO(6) from bit 6 can be discarded, or it can signal an overflow when it is a 1.

Since the carries are propagated through an AND gate in each half-adder cell 10, the LSB carry bit may have to pass through seven AND gates to reach the final carry out of bit 6 in a worst-case delay path. This is known as a ripple carry since the carry signal ripples through all bits of the adder or incrementer.

In full adders, various techniques have been used to reduce this worst-case delay of the carry rippling through all the bits of the adder. For example, look-ahead logic can be used to generate an intermediate carry by looking at the binary-number inputs and carry into a group of bits.

What is desired is a look-ahead for an incrementer rather than for a full adder. An incrementer with a carry-lookahead is desired to reduce carry ripple delays in a fast incrementer. A pipelined incrementer is desired to further reduce delays that occur within a clock cycle.

DETAILED DESCRIPTION

The present invention relates to an improvement in fast incrementers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 3:
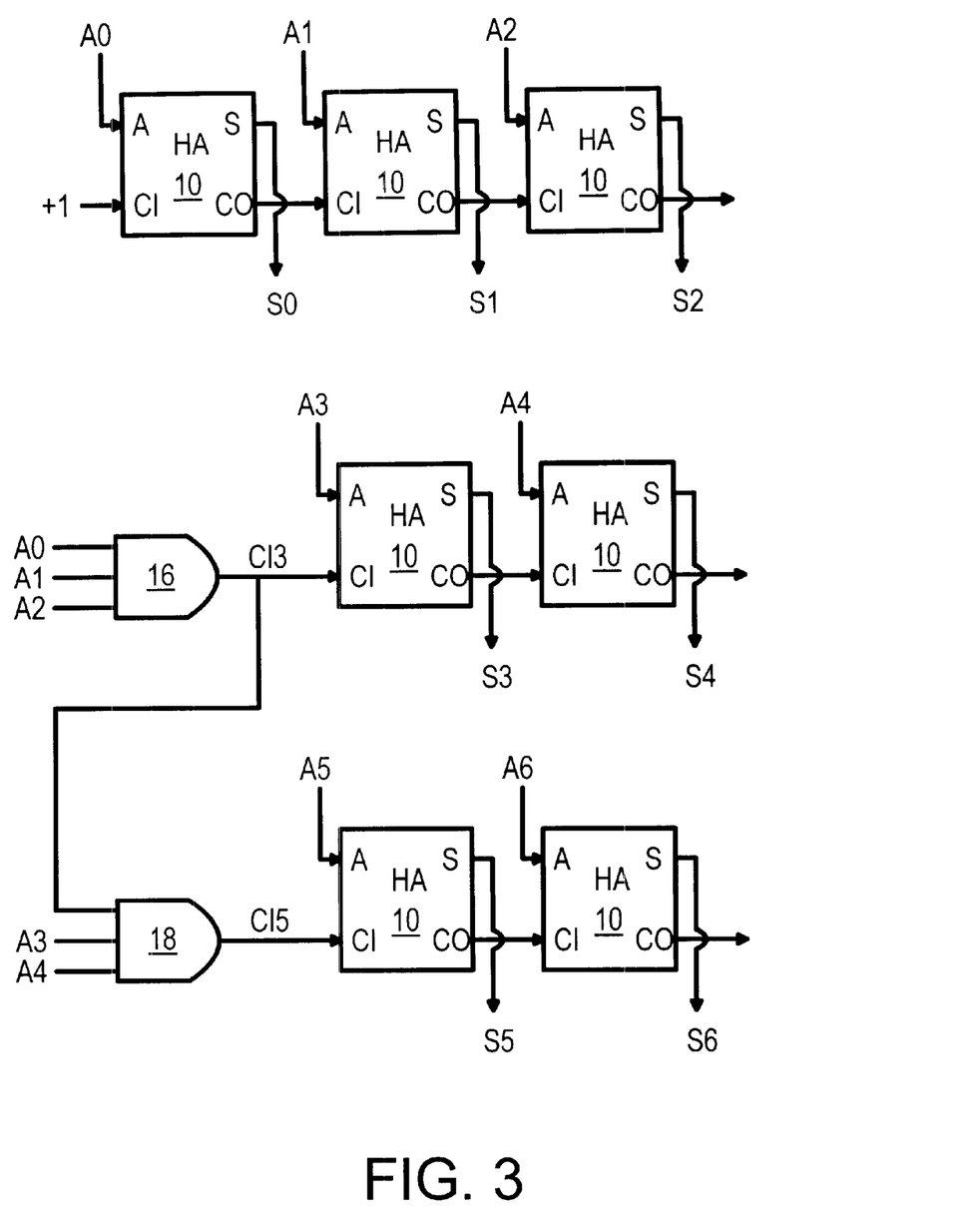
FIG. 3 is a diagram of an incrementer with a carry-lookahead.

FIG. 3—Carry Lookahead for an Incrementer

FIG. 3 is a diagram of an incrementer with a carry-lookahead. Rather than ripple the carry through each bit of the incrementer, logic can be added to generate intermediate carries.

The LSB carry input CI(0) is added to bit 0 of input word A by the first half-adder cell 10, generating the LSB of the sum, S(0). The carry output from bit-position 0 is coupled to the carry input of the half-adder cell 10 at bit position 1, where it is added to A(1) to generate S(1) and CO(1). The carry output CO(1) is applied as the carry input to bit-position 2. The third half-adder cell 10 adds A(2) to CI(2) to generate S(2) and CO(3).

The LSB carry input CI(0) thus ripples up through bit positions 0, 1, 2. There is a delay of 2 AND gates from CI(0) to CI(2).

Rather than use CO(2) as the carry input CI(3) to half-adder cell 10 at bit position 3, a lookahead carry is generated by AND gate 16. AND gate 16 receives inputs A(0), A(1), A(2) from the binary input word A. If it is assumed that the incrementer always increments, then CI(0) is always 1 and never 0. Then the carry output from bit position 2 is A(0) & A(1) & A(2), where "&" represents a logical AND operation. Thus AND gate 16 generates CI(3) to the half-adder cell 10 at bit position 3.

Using AND gate 16 to generate CI(3) rather than the carry output CO(2) from the third half-adder cell 10 reduces delay. There are 3 AND gate delays from CI(0) to CO(2), while only one AND-gate delay to CI3 when AND gate 16 is used. Thus the carry-lookahead provided by AND gate 16 reduces the CI(3) delay.

The intermediate carry CI3 generated by AND gate 16 is rippled through half-adder cells 10 for bit positions 3 and 4. However, the carry output CO(4) from bit position 4 is not used but instead discarded. A second intermediate carry-lookahead CI5 is generated by AND gate 18 for bit 5. This carry-lookahead CI5 is applied to carry input CI(5) of half-adder cell 10 for bit position 5. The second intermediate carry CI5 is rippled through the last 2 bit positions that generate sum bits S(5,6).

AND gate 18 receives A(3) and A(4) from the binary-word input A. When both these input bits are 1, the carry input to bit-position 3, CI3, is propagated by AND gate 18, which also received CI3 as an input. CI3 is generated by AND gate 16 from A(0), A(1), A(2). Thus CI5 is high when all five input bits A(1) to A(4) are high.

In general, for an incrementer that always increments, a lookahead carry input for any bit-position is high when all lower-position input bits are high. Any bit-position's carry lookahead could be generated by ANDing the binary-input bits below that position.

Since the incrementer has only one binary-word input, the carry-lookahead logic is much simpler than for a 2-input full adder. Only input bits from one binary input word need to be considered in the lookahead logic.

Figure 4:
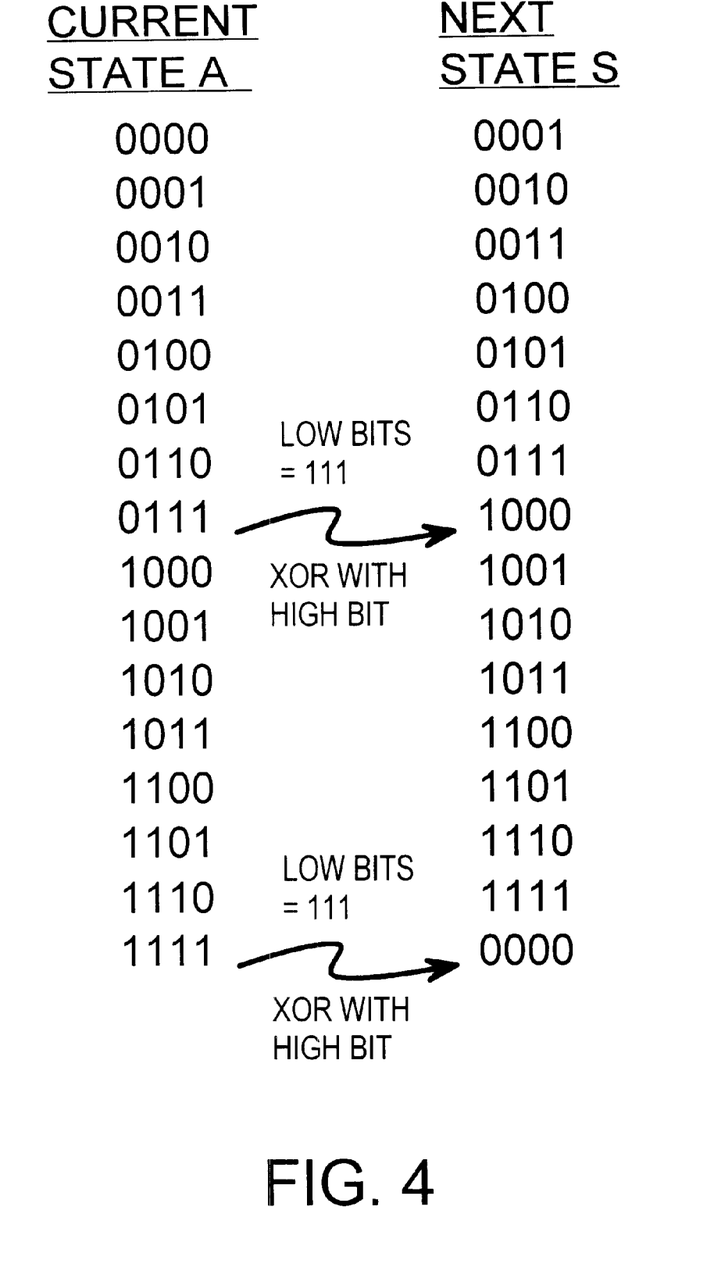
FIG. 4 is a table showing the sequence of states of a binary incrementer.

FIG. 4—Fixed Sequence of Incrementer States

FIG. 4 is a table showing the sequence of states of a binary incrementer. When the output of an incrementer is fed back to its input, the incrementer sequences through a series of states, or counts upward. A current state is represented by the binary-input word A and is shown in the left column of FIG. 4. The sum bits from the incrementer represent a next state that is generated by the incrementer when the input A is applied. Since the output, sum S, is fed back to the input A, the sequence counts upward in an increasing binary-number sequence.

For example, when input A is 0000, the sum is 0001, as shown in the first row. The sum 0001 is applied to the input A for the next clock cycle, as shown in the second row. The incrementer then generates the sum 0010 as the next state shown in the second row. Once the sequence reaches 1111, the next state or sum wraps back to 0000 as shown in the last row.

For any bit position (i), when all lower bits in an input A are high, then the carry-lookahead to the bit position (i) is high. The sum bit for bit position (i) is the XOR of the carry input CI(i) and the binary input A(i). Thus when the 111...1 condition occurs in the lower bits, the current sum bit is generated by XORing the carry in (which is a 1) with the current input bit A(i).

This is shown in the table in the 8th and 16th rows. The lower bits are 111, causing the carry in to be high. The input bit A(3) is XORed with the carry in, causing the uppermost input bit to toggle. Thus input 0111 produces the sum 1000, while the input 1111 produces the sum 0000.

For other rows, the lower bits are not all ones. The carry input CI3 is low, so the uppermost bit does not change. The uppermost bit only changes when the lower bits are all ones.

Figure 5:
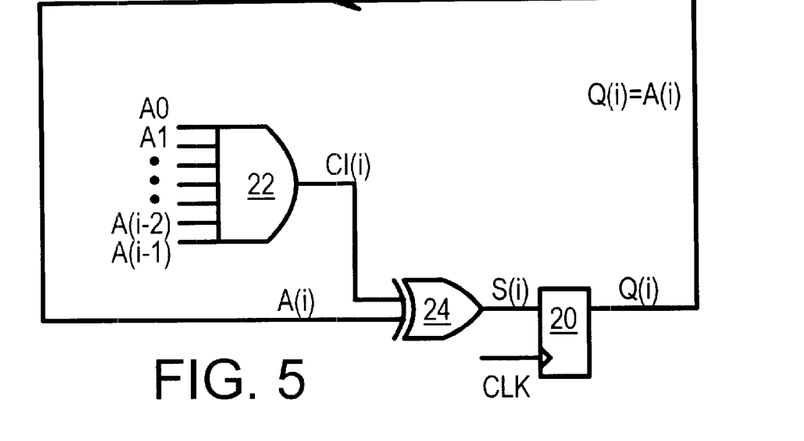
FIG. 5 illustrates detection of the all-ones condition for a bit-position i of an incrementer.

FIG. 5—Detection of All-Ones Condition

The inventor detects this all-ones condition, further simplifying the incrementer's logic. FIG. 5 illustrates detection of the all-ones condition for a bit-position i of an incrementer. When all lower bits A(i−1), A(i−2), ... A(1), A(0) of the input A are high, AND gate 22 outputs a high as carry input CI(i). This is the 1111 ... 11 condition when the upper bit i toggles.

XOR gate 24 receives CI(i) from AND gate 22 and toggles A(i) when CI(i) is high.

Otherwise, XOR gate 24 passes input A(i) through without change as the sum bit S(i) for this bit-position i.

The state of sum bit S(i) from XOR gate 24 is latched by flip-flop 20 when clock CLK rises. The latched sum bit is output by flip-flop 20 as output Q(i), and is fed back to the incrementer's input A as input bit A(i). Signals Q(i) and A(i) can be the same signal. The logic of FIG. 5 can be repeated for other bit-positions in the incrementer so that each flip-flop 20 stores a different bit-position of the sum S. However, loading of the lower input lines, especially A(0) and A(1), can significantly increase delays in carry generation. Larger incrementers with many bit positions are especially effected. For example, a 32-bit incrementer could have A(0) fan out to as many as 31 AND gates 22. Driving such a large load increases delays.

Figure 6:
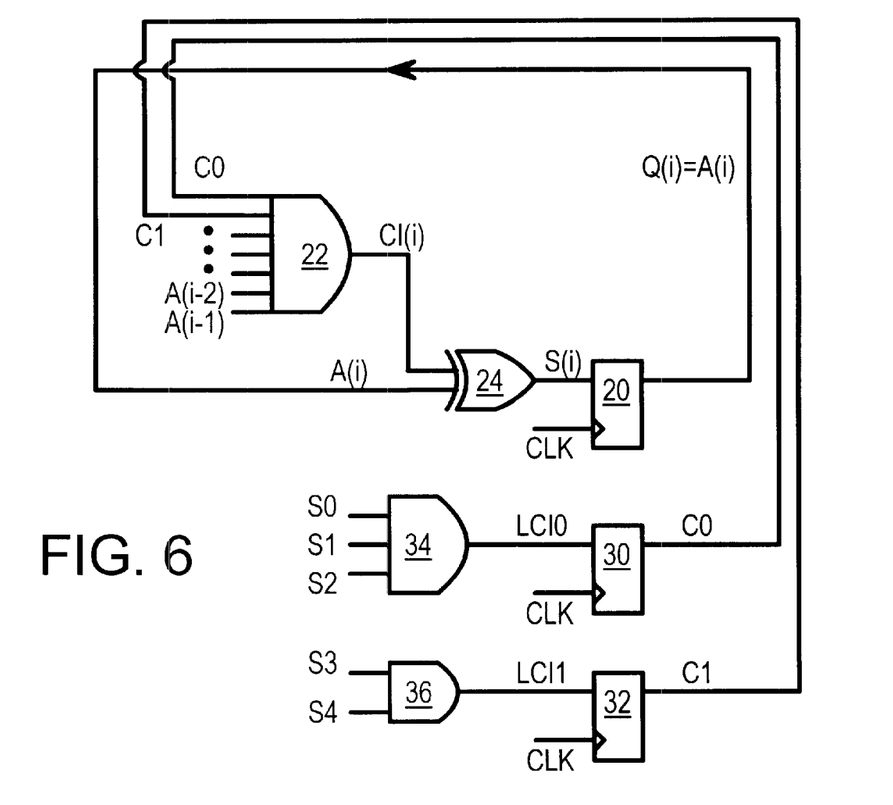
FIG. 6 shows pipelining of carry-lookahead generation for an incrementer.

FIG. 6—Pipelining of Carry-Lookahead

FIG. 6 shows pipelining of carry-lookahead generation for an incrementer. To reduce delays, some of the lower input bits can be combined together before being input to AND gates 22 of the many other bit positions. However, the carry-generation delays may still be too large for higher-speed incrementers that use a short clock period in which the logic paths must be propagated.

The inventor has realized that the carry generation can be pipelined. Since the incrementer sequences through a fixed series of states or binary counts, the next several states are known in advance. An incrementer cannot jump from 1001 to 1110 without passing through 1010, 1011, 1100, and 1101. The inventor uses this knowledge of the sequence of states to pipeline carry generation.

AND gate 22 detects the 1111 condition of the lower input bits A(i−1), A(i−2), etc. to generate CI(i). C(i) causes A(i) to be toggled by XOR gate 24 to generate sum bit S (i), which is latched by flip-flop 20.

However, the lowest 5 input bits A(0), A(1), A(2), A(3), and A(4) are not input to AND gate 22. Instead, pipelined carry lookahead signal C0, C1 are input to AND gate 22. This reduces the number of inputs to AND gate 22 and its complexity and propagation delay.

While carry lookahead signal C0 could be generated by ANDing input signal A(0), A(1), and A(2), it is instead generated by ANDing the corresponding sum signals during the previous clock cycle. Thus AND gate 34 ANDs sum bits S(0), S(1), S(2) to generate LCI0, which is input to flip-flop 30 and latched. Likewise, AND gate 36 ANDs sum bits S(3), S(4) to generate LCI1, which is input to flip-flop 32 and latched to generate pipelined carry lookahead signal C1.

The output of flip-flop 30 is pipelined carry lookahead signal C0 that is input to AND gate 22. Sum bits S rather than input bits A are combined to generate the pipelined carry-lookahead signals since the sum bits become the input bits after the next rising clock edge.

AND gate 22, XOR gate 24, and flip-flop 20 can be replicated for other bit-positions of the incrementer. However, carry lookahead generation by AND gates 34, 36 and pipelining flip-flops 30, 32 can be instantiated only once and shared by many bit-positions.

Figure 7:
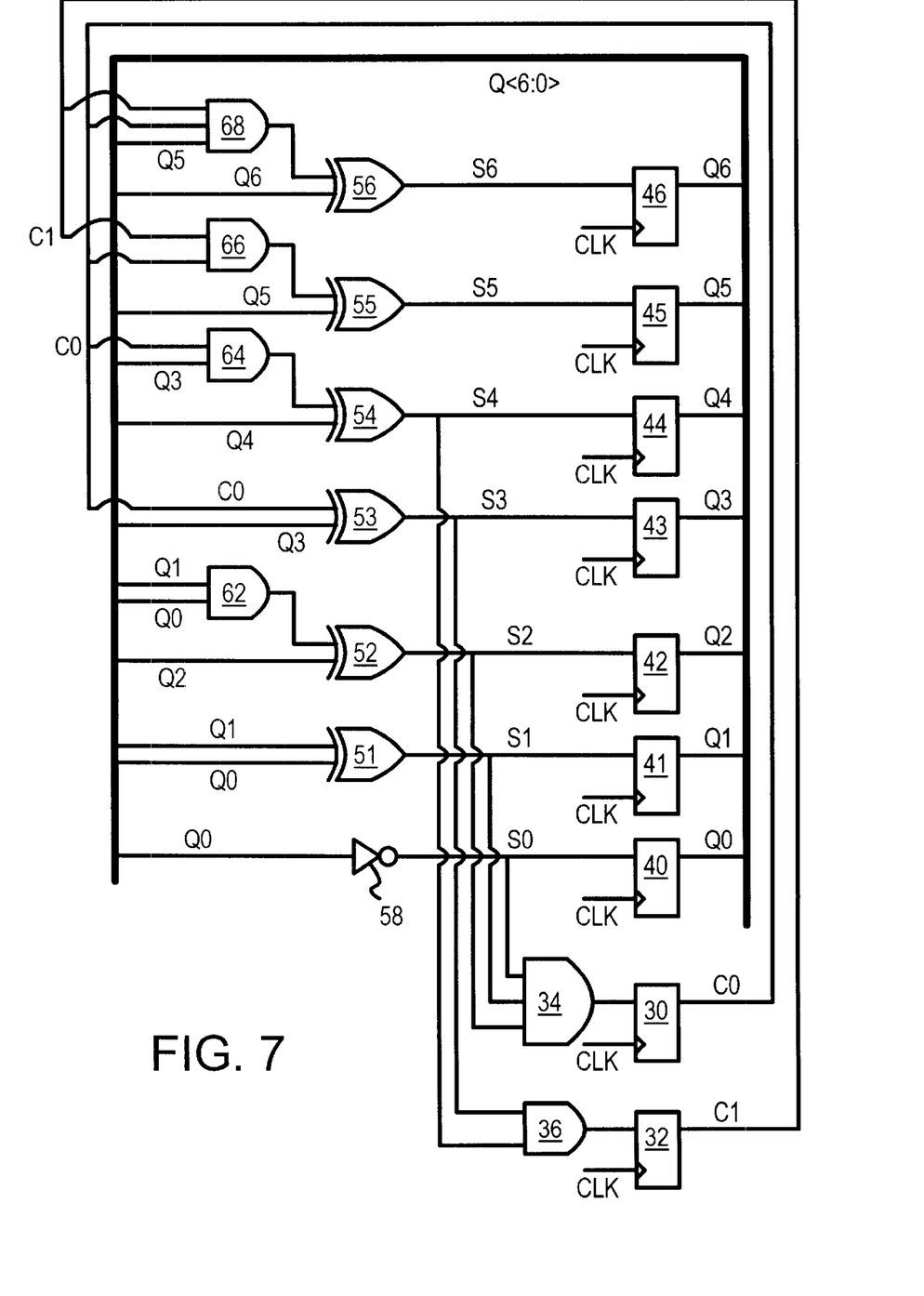
FIG. 7 is a diagram of a 7-bit incrementer with pipelined carry-lookahead generation.

FIG. 7—7-bit Incrementer with Pipelined Carry-Lookahead

FIG. 7 is a diagram of a 7-bit incrementer with pipelined carry-lookahead generation. Flip-flops 40–46 store sum bits S(0) to S(6) on the rising edge of clock CLK, causing these sum bits to be output as Q(0) to Q(6) over the next clock period. These latched sum bits are fed back as the incrementer's input bits.

Carry-lookahead generation is pipelined. AND gate 34 receives lower sum bits S(0), S(1), S(2). The output of AND gate 34 is applied to the D input of flip-flop 30, which latches the pre-lookahead and drives the pipelined carry lookahead signal C0 during the following clock cycle. Likewise, AND gate 36 receives lower sum bits S(3), S (4). The output of AND gate 36 is applied to the D input of flip-flop 32, which latches this second pre-lookahead signal and drives the second pipelined carry lookahead signal C1 during the following clock cycle.

The LSB sum bit S(0) is toggled each clock cycle by inverter 58, which receives Q from flip-flop 40 and also drives the D-input to flip-flop 40. XOR gate 51 receives Q (0) and Q(1) and toggles Q(1) when Q(0) is high. Otherwise Q(1) is passed through to the D-input of flip-flop 41 as S(1).

AND gate 62 drives the upper input to XOR gate 52 high when both Q(0) and Q(1) are high. This is the 11 carry-in condition. XOR gate 52 receives this carry in generated by AND gate 62 and toggles Q(2) when the output of AND gate 62 is high. Otherwise Q(2) is passed through to the D-input of flip-flop 42 as S(2).

The pipelined carry lookahead signal C0 from flip-flop 30 is applied to the upper input of XOR gate 53. When pipelined carry lookahead signal C0 is high (sum bits S(0), S(1), S(2) were all high in the prior clock period) XOR gate 53 toggles Q(3) from the Q-output of flip-flop 43 to generate sum S(3) to the D-input of flip-flop 43. Otherwise XOR gate 53 passes Q(3) through unchanged as S(3) to flip-flop 43.

AND gate 64 drives the upper input to XOR gate 54 high when both pipelined carry lookahead signal C0 and Q(3) are high. This is the 1111 carry-in condition. XOR gate 54 receives this composite carry-in generated by AND gate 64 and toggles Q(4) when the output of AND gate 64 is high. Otherwise Q(4) is passed through to the D-input of flip-flop 44 as S(4).

For bit-position 5, AND gate 66 drives the upper input to XOR gate 55 high when both pipelined carry lookahead signal C0 and C1 are high. This is the 11111 carry-in condition when all five lower sum bits were high in the prior clock cycle. XOR gate 55 receives this composite carry-in generated by AND gate 66 and toggles Q(5) when the output of AND gate 66 is high. Otherwise Q(5) is passed through to the D-input of flip-flop 45 as S(5).

For the most-significant-bit (MSB) bit-position (6), AND gate 68 drives the upper input to XOR gate 56 high when both pipelined carry lookahead signal C0 and C1 are high and Q(5) is high. This is the 111111 carry-in condition when all six lower sum bits are high. XOR gate 56 receives this composite carry-in generated by AND gate 68 and toggles Q(6) when the output of AND gate 68 is high. Otherwise Q(6) is passed through to the D-input of flip-flop 46 as S(6).

Figure 8:
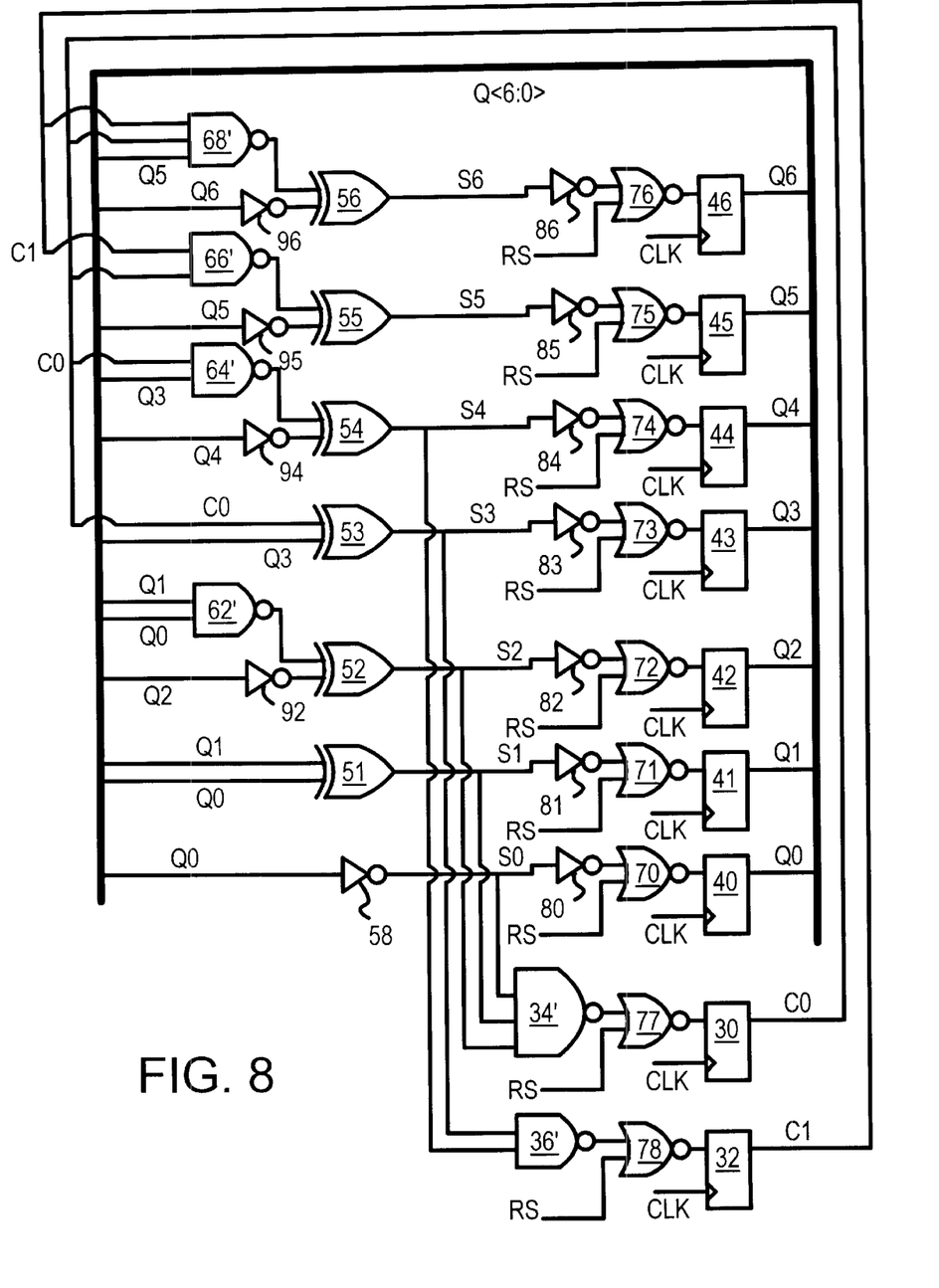
FIG. 8 is a diagram of a 7-bit incrementer with pipelined carry-lookahead generation and synchronous reset.

FIG. 8—Resetable 7-bit Incrementer with Pipelined Carry-Lookahead

FIG. 8 is a diagram of a 7-bit incrementer with pipelined carry-lookahead generation and synchronous reset. Flip-flops 40–46 store sum bits S(0) to S(6) on the rising edge of clock CLK, causing these sum bits to be output as Q(0) to Q(6) over the next clock period. These latched sum bits are fed back as the incrementer's input bits.

Inverting NAND gates 62', 64', 66', 68' operate as AND gates 62, 64, 66, 68 described earlier for FIG. 7, but with an active-low output to the XOR gates 52, 54, 55, 56. Inverters 92, 94, 95, 96 invert the fed-back inputs Q(2), Q(4), Q(5), Q(6) to XOR gates 52, 54, 55, 56. This allows the sum bits to have the same (positive or active-high) polarity as described before. XOR gates 52, 54, 55, 56 invert the Q input when the carry-in from the NAND gate is high (inactive).

A synchronous reset is added by inserting inverters 80–86 and NOR gates 70–76 between the sum bits S(0:6) and the D-inputs to flip-flops 40–46. The lower inputs to NOR gates 70–76 is an active-high reset signal RS. When RS is high, NOR gates 70–76 drive a low to the D-inputs of flip-flops 40–46. Otherwise the sum bits are passed through after a double inversion.

NAND gates 34', 36' perform the same function as AND gates 34, 36 described earlier, and are followed by NOR gates 77, 78 which drive a low to the D-inputs of flip-flops 30, 32 when reset signal RS is high. Thus pipelined carry lookahead signals C0, C1 are also resetable.

ALTERNATE EMBODIMENTS

Several other embodiments are contemplated by the inventor. For example the incrementer can count upward or downward (decrement) and the increment can be a value other than 1, such as +2, +4, −4, etc. The incrementer can count in binary or in gray code or in some other sequence. Falling-edge-triggered flip-flops could be substituted for rising-edge flip-flops. Various logic inversions and applications of DeMorgan's theorem could be applied to adjust the logic gates. Rather than XOR gates, exclusive-NOR (XNOR) gates could be employed without inverters on the Q input to the XNOR gate.

Different groupings of sum bits into the pipelined carry lookahead signals can be substituted, and the pipelined carry-lookahead logic can be combined or rippled together before or after the flip-flops. More than two pipelined carry lookahead signals could be generated and latched. Reset logic can be added to the incrementer, such as by making all flip-flops settable or resetable, either asynchronously or synchronously. The incrementer could be reset to a value other than zero, such as to a non-zero starting address or pointer. Other logic can be added or inserted for other functions, such as to vary the increment amount or direction of counting. The clock could be a free-running clock, or it could be paused or gated so that the incrementer stops counting for periods of time.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. §1.72(b). Any advantages and benefits described may not apply to all embodiments of the invention. When the word "means" is recited in a claim element, Applicant intends for the claim element to fall under 35 USC §112, paragraph 6. Often a label of one or more words precedes the word "means" The word or words preceding the word "means" is a label intended to ease referencing of claims elements and is not intended to convey a structural limitation. Such means-plus-function claims are intended to cover not only the structures described herein performing the function and their structural equivalents, but also equivalent structures. For example, although a nail and a screw have different structures, they are equivalent structures since they both perform the function of fastening. Claims that do not use the word means are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A pipelined incrementer comprising:

count registers for storing a current count of the pipelined incrementer, the count registers receiving sum bits that are stored as the current count in response to a clock input;

pre-carry registers, receiving pre-carry signals that are stored as pipelined carry lookahead signals in response to the clock input;

pre-carry logic, receiving at least some of the sum bits, for generating the pre-carry signals as a function of a next count indicated by the sum bits, the next count being after the current count in a pre-determined sequence; and sum logic, receiving the current count from the count registers, and receiving the pipelined carry lookahead signals from the pre-carry registers, for generating the sum bits that indicate the next count, whereby carry signals are generated the sum bits that indicate the next count, stored in the pre-carry register, and used by the sum logic in a following clock cycle.

2. The pipelined incrementer of claim 1 wherein the sum logic further comprises for at least some bit-positions of the current count:

toggle logic, receiving a count bit for a bit-position of the current count from one of the current count registers, and receiving a local carry-in signal for the bit-position, the toggle logic toggling the count bit to generate the sum bit for the bit-position in response to the local carry-in signal for the bit-position; and all-ones detect logic, receiving count bits for lesser bit-positions from some of the current count registers, and some of the bit-positions of the current count receiving the pipelined carry lookahead signals instead of some of count bits for lesser-significant bit-positions of the current count, for activating the local carry-in signal when all lesser-significant bit-positions are logical one, whereby a count bit for a bit-position is toggled when all lesser-significant bit-positions of the current count are logical one as indicated by the count bits or the pipelined carry lookahead signals.

3. The pipelined incrementer of claim 2 wherein the toggle logic is replicated for all bit-positions of the current count above a least-significant bit-position;

wherein the all-ones detect logic is replicated for bit-positions of the current count above two least-significant bit-positions, whereby toggle and all-ones detect logic is replicated for several bit-positions.

4. The pipelined incrementer of claim 2 wherein the all-ones detect logic is not replicated for an upper bit-position of the current count that corresponds to a first pipelined carry lookahead signal that is generated from all bit-positions below the upper bit-position.

5. The pipelined incrementer of claim 2 wherein the toggle logic for a bit-position comprises an exclusive-OR (XOR) gate or an exclusive-NOR (XNOR) gate.

6. The pipelined incrementer of claim 2 wherein the all-ones detect logic for a bit-position comprises an AND gate or a NAND gate that receives a group of inputs selected from the count bits and the pipelined carry lookahead signals.

7. The pipelined incrementer of claim 6 wherein the pre-carry logic comprises a first AND or NAND gate that receives as inputs a first group of lowest-significance bit-positions of the sum bits, and a second AND or NAND gate that receives as inputs a second group of next-lowest-significance bit-positions of the sum bits that are in more significant bit-positions than the first group.

8. The pipelined incrementer of claim 7 wherein the sum bits comprise at least 7 bits and the count bits comprise at least 7 bits and the pipelined carry lookahead signals comprise at least 2 signals, whereby the pipelined incrementer is at least a 7-bit counter.

9. The pipelined incrementer of claim 8 wherein the next count follows the current count in a binary-number sequence.

10. The pipelined incrementer of claim 2 further comprising:

reset logic, coupled to the count registers and to the pre-carry registers, for resetting the current count to an initial value in response to a reset signal.

11. The pipelined incrementer of claim 10 wherein the reset logic comprises NOR gates between the sum bits and inputs to the count registers, the NOR gates receiving the reset signal, whereby reset is synchronous to the clock input.

12. A sequencer comprising:

sequence register means, responsive to a clock, for storing sum bits input to the sequence register means as current state bits in response to the clock;

first carry register means, responsive to the clock, for storing a first pre-carry signal that is input to the first carry register means, and for outputting a first pipelined carry signal;

first pre-carry logic means, receiving a first group of the sum bits, for generating the first pre-carry signal;

second carry register means, responsive to the clock, for storing a second pre-carry signal that is input to the second carry register means, and for outputting a second pipelined carry signal;

second pre-carry logic means, receiving a second group of the sum bits, for generating the second pre-carry signal; and combinatorial logic means, receiving the current state bits from the sequence register means and receiving the first and second pipelined carry signals, for generating the sum bits, whereby pre-carry signals are generated from the sum bits and stored for use in a next cycle of the clock.

13. The sequencer of claim 12 wherein the combinatorial logic means further comprises:

toggle means for each sum bit, each toggle means receiving a current state bit and generating a sum bit for a different bit-position, the toggle means for inverting a logical state of the current state bit to generate the sum bit.

14. The sequencer of claim 13 wherein the toggle means for a least-significant-bit (LSB) of the sum bits is an inverter that inverts the current state bit to generate the sum bit for a LSB bit-position;

wherein the toggle means for bit-positions above the LSB bit-position each comprise an exclusive-OR (XOR) gate that has a second control input, the second control input being activated to cause the toggle means to invert the current state bit, but being de-activated to cause the toggle means to not invert the current state bit.

15. The sequencer of claim 14 wherein the sum bits and the current state bits include a first group, a second group, and a third group of bit-positions;

wherein the combinatorial logic means further comprises a first logic grouping that generates sum bits in the first group, a second logic grouping that generates sum bits in the second group, and a third logic grouping that generates sum bits in the third group;

wherein the first logic grouping of the combinatorial logic means does not receive the first and second pipelined carry signals but only receives current state bits from the first group;

wherein the second logic grouping of the combinatorial logic means does not receive the second pipelined carry signal but only receives current state bits from the second group and receives the first pipelined carry signal;

wherein the third logic grouping of the combinatorial logic means receives the first and second pipelined carry signals and receives current state bits from only the third group.

16. The sequencer of claim 15 wherein a lowest bit-position in the second logic grouping has a toggle means that receives the current state bit for the bit-position and receives the first pipelined carry signal as the second control input;

wherein other bit-positions in the second logic grouping have a toggle means with a second control input driven by a detect means for detecting when all lower bit-positions are in a pre-determined state that toggles the sum bit in the bit-position.

17. The sequencer of claim 15 wherein each bit-position in the third logic grouping comprises:

toggle means, receiving the current state bit for the bit-position, for toggling the current state bit to generate the sum bit in response to a second control input that is driven by a control signal for the bit-position; and detect means, driving the control signal to the toggle means, for detecting when all when all lower bit-positions are in a pre-determined state that toggles the sum bit in the bit-position;

wherein a lowest bit-position in the third logic grouping has a detect means that receives the first and second pipelined carry signals;

wherein other bit-positions in the third logic grouping have a detect means that receives the first and second pipelined carry signals and at least one of the current state bits in the third group.

18. The sequencer of claim 17 wherein the toggle means comprises an exclusive-OR (XOR) gate and wherein the detect means comprises an AND gate.

19. A pipelined-carry incrementer comprising:

a first state register receiving a first sum bit and outputting a first state bit synchronized to a clock;

a second state register receiving a second sum bit and outputting a second state bit synchronized to the clock;

a third state register receiving a third sum bit and outputting a third state bit synchronized to the clock;

a fourth state register receiving a fourth sum bit and outputting a fourth state bit synchronized to the clock;

a fifth state register receiving a fifth sum bit and outputting a fifth state bit synchronized to the clock;

a sixth state register receiving a sixth sum bit and outputting a sixth state bit synchronized to the clock;

a seventh state register receiving a seventh sum bit and outputting a seventh state bit synchronized to the clock;

a first carry register receiving a first pre-carry and outputting a first pipelined carry synchronized to the clock;

a second carry register receiving a second pre-carry and outputting a second pipelined carry synchronized to the clock;

a first pre-carry gate, receiving the first, second, and third sum bits and outputting the first pre-carry;

a second pre-carry gate, receiving the fourth and fifth sum bits and outputting the second pre-carry;

second toggle logic that toggles the second state bit to generate the second sum bit when the first state bit is high;

third toggle logic that toggles the third state bit to generate the third sum bit when the first state bit and the second state bit are both high;

fourth toggle logic that toggles the fourth state bit to generate the fourth sum bit when the first pipelined carry is high;

fifth toggle logic that toggles the fifth state bit to generate the fifth sum bit when the first pipelined carry and the fourth state bit are both high;

sixth toggle logic that toggles the sixth state bit to generate the sixth sum bit when the first pipelined carry and the second pipelined carry are both high;

seventh toggle logic that toggles the seventh state bit to generate the seventh sum bit when the first pipelined carry and the second pipelined carry and the sixth state bit are all high.

20. The pipelined-carry incrementer of claim 19 wherein the third, fifth, sixth, and seventh toggle logic comprise an AND gate that drives an input to an exclusive-OR (XOR) gate;

wherein the second and fourth toggle logic comprise an XOR gate.

\* \* \* \* \*